United States Patent [19]

Gugle et al.

[11] Patent Number: 4,636,124
[45] Date of Patent: Jan. 13, 1987

[54] ADHESIVE FRICTION WELD FASTENER

[75] Inventors: James E. Gugle, Crystal Lake; Brian R. Peek, Steger, both of Ill.

[73] Assignee: Illinois Tool Works Inc., Chicago, Ill.

[21] Appl. No.: 730,416

[22] Filed: May 6, 1985

[51] Int. Cl.[4] ............................................. F16B 39/02
[52] U.S. Cl. ..................................... 411/82; 411/258; 411/377; 156/73.5
[58] Field of Search ................. 411/82, 258, 376, 377, 411/908; 24/90 HA; 156/73.5, 581, 582, 583.1; 264/68

[56] References Cited

U.S. PATENT DOCUMENTS

| 3,438,825 | 4/1969 | Fidler | 156/73.5 |
| 3,580,793 | 5/1971 | Hewitt | 156/73.5 |
| 4,250,596 | 2/1981 | Hara et al. | 24/90 HA |
| 4,477,307 | 10/1984 | Cearlock et al. | 156/73.5 |
| 4,551,189 | 11/1985 | Peterson | 24/90 HA |

FOREIGN PATENT DOCUMENTS 48-20232  6/1973  Japan ................................. 156/73.5

Primary Examiner—Gary L. Smith
Assistant Examiner—Neill Wilson
Attorney, Agent, or Firm—J. P. O'Brien; T. W. Buckman

[57] ABSTRACT

A one-piece thermoplastic fastener assembly is disclosed having a friction-weld fastening surface with a centrally located heat-activated adhesive pellet. A plurality of deflector segments are integrally formed with the friction weld surface at the plurality of radial distances from the axis of rotation. The shape of the base member and the thickness of the plurality of deflector segments are selected to cause any imaginary straight line emanating from the axis of rotation and passing through the marginal edge of each intercepted deflector segment to extend below the radial plane which passes across the outer marginal edge of the innermost deflector segment to thereby causes even distribution of the heat-activated adhesive across the friction weld surface in response to a driving rotation of the base member.

5 Claims, 2 Drawing Figures

ADHESIVE FRICTION WELD FASTENER

BACKGROUND OF THE INVENTION

This invention relates to a friction weld type fastener and in particular to a friction weld type fastener having a centrally located heat-activated adhesive pellet for increasing its adhesion on certain surfaces, such as wood and painted surface.

Friction weld fastener systems, such as disclosed in U.S. Pat. No. 4,477,307, do not provide adequate adhesion with some surfaces such as wood or painted metal. One known manner of increasing the adhesion characteristics for such surfaces is to add a heat activated adhesive pellet at the center of the friction weld fastener. Upon axial and rotative forces being applied to the base of the fastener, the heat-activated adhesive melts and spreads across the friction weld surface. The spreading of the melted head activated adhesive is brought about by the centrifugal force acting on the adhesive during spinning.

This invention is directed to the means for distributing the melted head activated adhesive to provide an even distribution across the face of the friction weld surface. In accordance with the principles of this invention the distribution means comprises a plurality of deflector segments which are disposed on the friction weld surface at different radial lengths from the axis of rotation. The shape of the base member and the thickness of the plurality of the deflector segments is selected to cause any imaginary straight line which emanates from the axis of rotation to pass across the outer marginal edge of each intercepted deflector segment to extend below the radial plane which passes across the outer marginal edge of the innermost deflector segment.

DESCRIPTION OF DRAWINGS

For a better understanding of this invention, reference may be made to the accompanying drawings, in which.

DESCRIPTION OF PREFERRED EMBODIMENT

Figure 1:
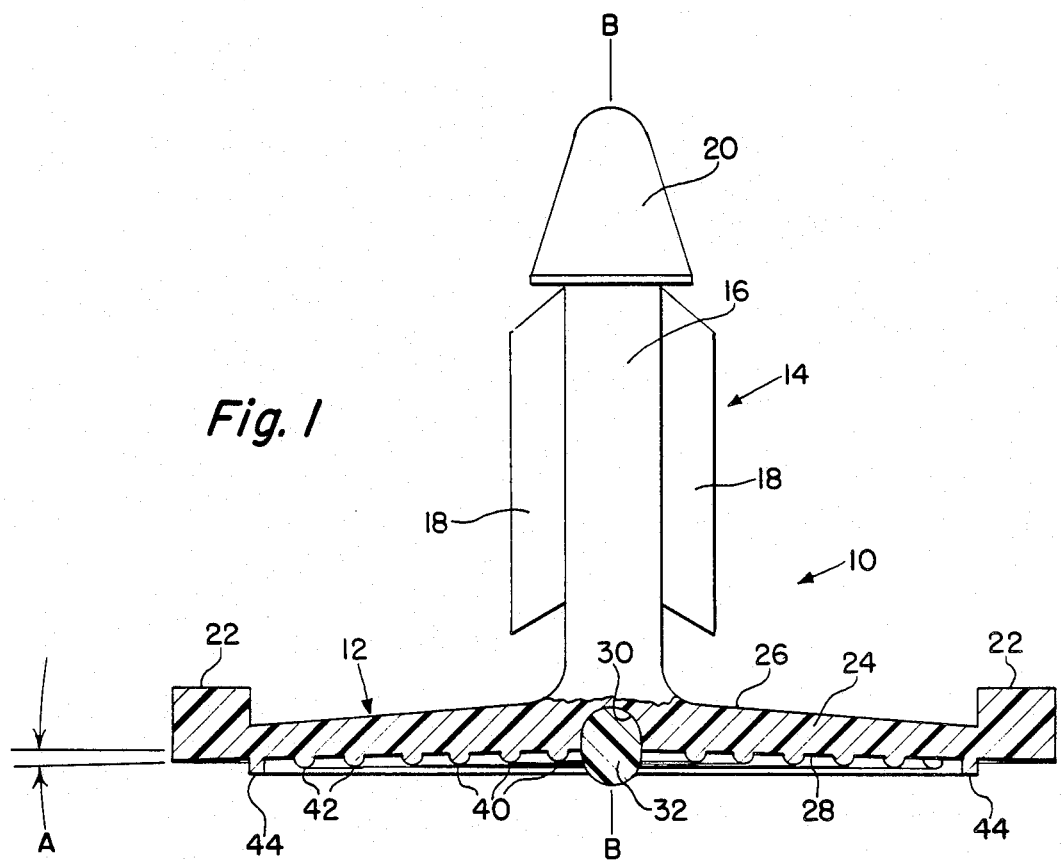
FIG. 1 is a cross sectional view of a one-piece thermoplastic fastener embodying the principles of this invention.

There is illustrated in FIG. 1, a one-piece thermoplastic fastener assembly generally designated by the reference numeral 10. Fastener assembly 10 is constructed with a friction weld fastener member 12 and a shank-type fastener member 14.

The design of the shank-type fastener member 14 forms no part of this invention and is shown for illustrative purposes only. A typical shank-type fastener member of the type shown is disclosed in U.S. Pat. No. 3,810,279, which is assigned to the same assignee as this invention. Fastener member 14 has a central stem 16 with a plurality of radially extending flexible wings 18. A tapered nose portion 20 is integrally formed on its outer end to guide it into an apertured opening. Fastener member 14 is installed in an apertured panel by having its resilient wings 18 resiliently engaging the inner wall of the apertured panel to resist withdrawal of the fastener from the apertured panel.

Friction weld fastener member 12 is generally known as a spin weld type fastener or friction weld type fastener. Fastener 12 is depicted with a pair of radially extending projections or ear portions 22. The use of frangibly connected ears 22 for driving a thermoplastic fastener member is the subject of U.S. Pat. No. 4,477,307, which is assigned to the same assignee as this invention.

Friction weld fastener member 12 comprises a circular base 24 molded of a thermoplastic material into a generally circular configuration. Base 24 has a solid top wall 26 to which the stem 16 of fastener 14 is integrally connected at its center portion.

Friction weld surface 28 is formed on the surface opposite to the top wall 26. In the center portion of the friction weld surface 28 there is formed inwardly a cavity 30. A heat activated adhesive pellet 32 is mounted in cavity 30 and extends beyond the surface of friction weld surface 28. The type of materials selected for the heat activated adhesive pellet 32 comprises any adhesive having good bonding affinity for both the material of thermoplastic base 12 and the substrate material on which it is to be bonded. The thickness of the pellet 32 is preferably greater than the cavity 30 so that it extends beyond the surface of friction weld surface 28 to initiate melting of the heat activated adhesive material prior to the friction weld process begins.

One successful heat activated adhesive material for bonding between a nylon thermoplastic fastener base and a terpolymer elastomer substrate is the combination of an epoxy resin and a polyamide latent catalyst.

Another example of a heat-cured adhesive is the Accuthane ® UR-1100, adhesive which is an urethane prepolymer manufactured by H. B. Fuller Company. This adhesive is designed for bonding to substrate such as nylon, epoxy 3 MC, polyester 3 MC and metallic surfaces.

Figure 2:
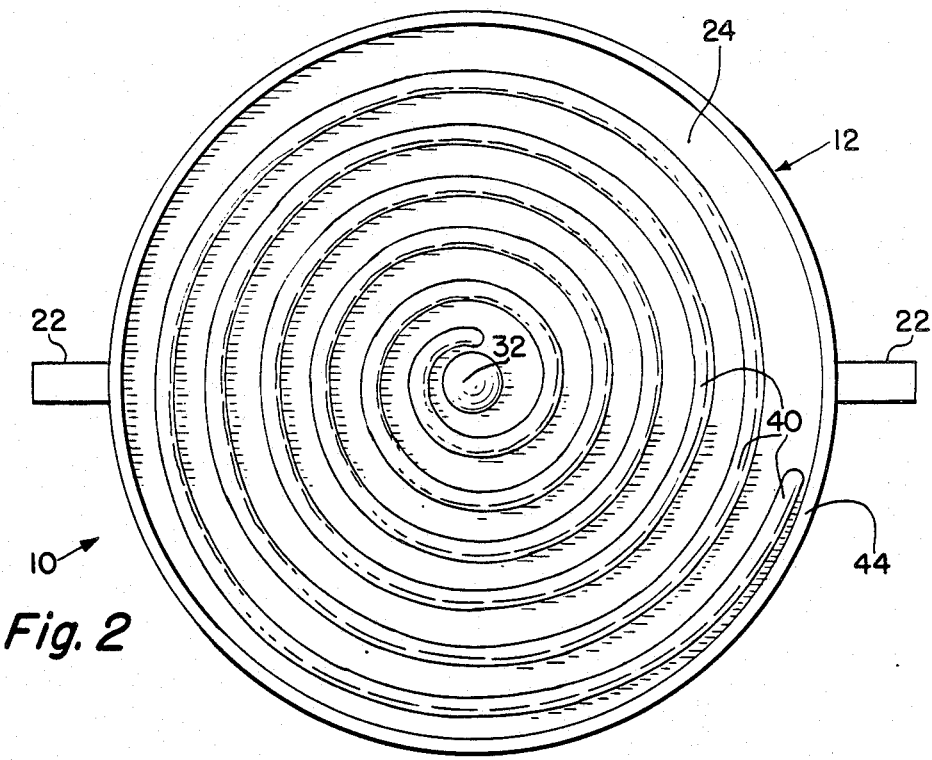
FIG. 2 is a bottom plan view of the preferred embodiment of this invention illustrated in FIG. 1.

Because the fastener assembly 10 is rotated at a high speed when friction weld, this invention provides a means to prevent the heat activated adhesive pellet 32 from being driven away from the base 12 and also provides a means for uniformly distributing the heat activated adhesive across the surface of friction weld surface 28. The adhesive distributing means is provided by the arrangement of forming deflector segments across the surface of friction weld surface 28. In the preferred embodiment of FIGS. 1 and 2 the deflector segments is shown in the form of a continuous spiral rib 40 which extends between the central portion of the friction weld surface 28 to a point adjacent to its periphery.

In order to intercept a small portion of the heat activated adhesive material 32 as it is being driven outwardly by centrifugal force, each loop of the continuous spiral rib 40 has a marginal edge 42 which is intercepted by an imaginary straight line emanating from the axis of rotation "B—B", where this imaginary straight line is "A" degrees below the radial plane passing through the outer marginal edge of the inner end portion of spiral rib 40. With this arrangement, it will be appreciated that each successive loop 42 of the continuous spiral 40 will intercept a portion of the melted heat-activated adhesive 32 as it is being driven by centrifugal force towards the perimeter of the base 12.

There are two alternative ways to form the angle "A". In the embodiment shown in FIG. 1, this angle is formed by having the continuous spiral 40 of a constant thickness and by forming the base member 12 so that the friction engaging surface 28 is slightly concave so that its peripheral edge is below the radial plane of axis "B—B". This angle "A" is quite small of the order of 1½ degrees.

An alternative way of forming the angle "A", would be to form the friction weld surface 28 on a radial plane and construct the spiral rib 40, to have each succeeding loop to be slightly thicker.

To prevent any escapement of the heat activated material 32 and to ensure that the outer peripheral edge of the friction engaging surface 28 is firmly attached to the substrate, a circular wall member 44 of a diameter equal to the outer diameter of the friction engaging surface 28 is integrally formed on the friction weld surface 28. The thickness of the wall member is greater than the thickest portion of the spiral 42.

It will be appreciated that the deflector means for intercepting the adhesive material could be a variety of shapes and configurations. For example, it could consist of a series of concentric circular wall members or a series of spaced arcuate segments located at different radial distances from the center. Other alternative configurations could be a series of square or triangular shape wall members.

Although we have shown and described different forms of our invention, it will be appreciated by those skilled in the art that numerous modifications may be made therein without departing from the scope of the invention as recited in the following claims.

We claim:

1. A one-piece thermoplastic fastener comprising a symmetrically-shaped base member having a friction weld surface, a heat-activated adhesive pellet secured to the center portion of said friction weld surface about the axis of rotation of said base member, and a plurality of deflector segments integrally formed on said friction weld surface at a plurality of radial distances from said axis of rotation, where the shape of said base member and the thickness of said plurality of deflector segments are selected to allow any imaginary straight line emanating from said axis of rotation and passing across the outer marginal edge of each intercepted deflector segment to extend below the radial plane which passes across the outer marginal edge of the innermost deflector segment, said thickness of said plurality of deflector segments being uniform and said base member being shaped to form said friction weld surface with a slight concave configuration.

2. A one-piece thermoplastic fastener comprising a symmetrically-shaped base member having a friction weld surface, a heat-activated adhesive pellet secured to the center portion of said friction weld surface about the axis of rotation of said base member, and a plurality of deflector segments integrally formed on said friction weld surface at a plurality of radial distances from said axis of rotation, where the shape of said base member and the thickness of said plurality of deflector segments are selected to allow any imaginary straight line emanating from said axis of rotation and passing across the outer marginal edge of each intercepted deflector segment to extend below the radial plane which passes across the outer marginal edge of the innermost deflector segment, said plurality of deflector segments being formed by a continuous spiral rib that extends from said center portion of said friction weld surface to a location adjacent to the outer periphery edge.

3. A one-piece thermoplastic fastener comprising a circular-shaped base member having a friction weld surface, a heat activated adhesive pellet embedded in the center portion of said friction weld surface about the axis of rotation of said base member, and spiral-shaped deflector rib integrally formed on said friction weld surface and extending from said center portion to a location adjacent to the periphery of said base member, where the shape of said base member and the thickness along the length of said spiral-shaped deflector rib are selected to allow any imaginary straight line emanating from said axis of rotation and passing across the outer marginal edge of each loop of said spiral-shaped deflector rib to extend below the radial plane which passes across the outer marginal edge of the inner end of said spiral-shaped deflector rib.

4. A one-piece thermoplastic fastener as defined in claim 3, further comprising a skirt portion integrally formed around the periphery of said circular base member, where the thickness of said skirt portion is selected for said skirt portion to be intercepted by said any imaginary line to thereby prevent any escapement of said heat activated adhesive.

5. A one-piece thermoplastic fastener as defined in claim 3, wherein said spiral-shaped deflector rib is uniform in thickness and said base member is shaped to form said friction weld surface into a slight concave configuration.

* * * * *